I. Stadler, W. H. Staats & A. C. Schwanke.
Stalk-Cutter.

N° 93,493. Patented Aug. 10. 1869.

Attest:
H. J. Sprague
Lewis L. Gordon

Inventor:
Lucas Stadler,
William K. Staats,
August C. Schwanke,
per Atty
Thos. S. Sprague

United States Patent Office.

LUCAS STADLER, OF BOWEN, AND WILLIAM H. STAATS AND AUGUST C. SCHWANKE, OF LA PRAIRIE, ILLINOIS.

Letters Patent No. 93,493, dated August 10, 1869.

IMPROVEMENT IN STALK-CUTTER.

The Schedule referred to in these Letters Patent and making part of the same.

*To whom it may concern:*

Be it known that we, LUCAS STADLER, of Bowen, in the county of Hancock, and WILLIAM H. STAATS and AUGUST C. SCHWANKE, of La Prairie, in the county of Adams, and State of Illinois, have invented a new and useful Improvement in Stalk-Cutters; and we do declare that the following is a true and accurate description thereof, reference being had to the accompanying drawings, and to the letters of reference marked thereon, and being a part of this specification.

Figure 1:
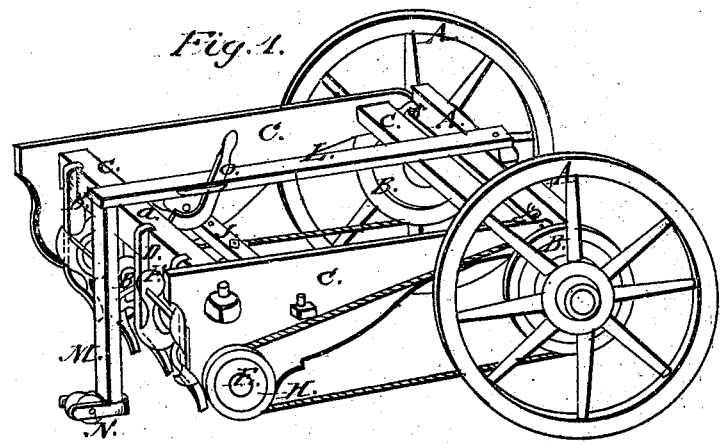
Figure 2:
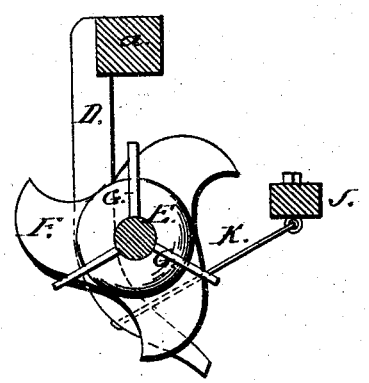
Figure 3:

Figure 1 is a perspective view from the rear, and Figures 2 and 3 are sections.

Like letters indicate like parts in each figure.

The nature of this invention relates to an improvement in that class of agricultural implements known as "stalk-cutters," and consists in the peculiar arrangement and construction of the knives, frame, &c., as hereinafter more fully described.

A, in the drawings, represents a suitable truck, provided with the pulleys B.

To this truck is pivoted the frame C, which carries the knives and rakes, as shown.

To the transverse bar *a* of this frame, at suitable distances apart, are attached the harrow or drag-teeth D, constructed as shown in fig. 3.

E represents a shaft, running across the lower portion of the frame, and carries the rotating knives F, working against one side of the drag-teeth D, the two making a cutting-apparatus like shears.

G are rake-teeth, attached to the shaft E about midway between the drag-teeth.

H is a pulley, rigidly attached to either end of the shaft E, to which motion is given by belt or chain from pulleys B.

From the transverse bar J, there extend rods K, fig. 2, to the drag-teeth, for the purpose of strengthening the same.

The longitudinal bar L, extending from the axle of the truck to the rear end of the machine, is provided with the perpendicular bar M, at the lower end of which is attached the caster-wheel N.

O is a lever, attached to the bar *a*, passing through a suitable guide and catch on bar L, for the purpose of raising or lowering the machine, as may be desired.

A tongue may be attached to the truck, or the entire machine may be fastened to the rear end of a wagon.

This invention is intended to be used in cutting stalks, and any trash that may be lying upon the ground, and its operation may be explained as follows, admitting, however, the supposition that the motive-power is attached to the truck A:

By driving over the field, the stalks or trash upon the same are gathered up by the drag-teeth D, and knives F, receiving motion from shaft E and pulleys H and B, cut the same, while the rake-teeth K throw the stuff backward, and out of the way, thereby preventing any clogging of the machine.

The frame A, being loosely attached to the truck, allows the machine to play freely up and down, as may be necessary, in going over uneven ground.

What we claim as our invention, and desire to secure by Letters Patent, is—

1. The shaft E, provided with cutters F and arms G, in connection with the drag-teeth D, frame C, truck A, pulleys B and H, and the belts R, when arranged and operating substantially as and for the purposes herein set forth.

2. In combination with the above-named parts, the bars L and M, caster-wheel N, and lever O, when constructed and operating substantially as and for the purposes described.

LUCAS STADLER.
WILLIAM H. STAATS.
AUGUST C. SCHWANKE.

Witnesses:
W. H. BURKE,
JOHN SPENCE.